United States Patent
Wilhelm (12)

(10) Patent No.: US 7,222,743 B1
(45) Date of Patent: May 29, 2007

(54) FLOATING APPARATUS FOR SUPPORTING FISHING ACCESSORIES

(76) Inventor: Tammy L. Wilhelm, 5211 Jefferson Ave., Muskegon, MI (US) 49442

( * ) Notice: Subject to any disclaimer, the term of this patent is extended or adjusted under 35 U.S.C. 154(b) by 265 days.

(21) Appl. No.: 10/866,898

(22) Filed: Jun. 15, 2004

(51) Int. Cl.
*B65D 25/00* (2006.01)
*A01K 97/00* (2006.01)

(52) U.S. Cl. .................... 220/560; 43/55; 43/54.1
(58) Field of Classification Search ............ 220/560; 43/55; 441/88
See application file for complete search history.

(56) References Cited

U.S. PATENT DOCUMENTS

| | | | |
|---|---|---|---|
| 4,638,593 A | | 1/1987 | Garcia |
| 4,794,723 A | | 1/1989 | Arnold et al. |
| 4,878,311 A | * | 11/1989 | Cano ................... 43/54.1 |
| 4,905,404 A | | 3/1990 | Pasion et al. |
| D309,937 S | | 8/1990 | Baxter |
| 5,369,796 A | * | 11/1994 | Kung ................... 455/344 |
| 5,402,596 A | | 4/1995 | Gillming, Jr. |
| 5,561,936 A | * | 10/1996 | Franke ................. 43/7 |
| 6,014,833 A | | 1/2000 | Benavidez |
| 6,269,587 B1 | | 8/2001 | Wallace |

* cited by examiner

*Primary Examiner*—Anthony D. Stashick
*Assistant Examiner*—Shawn M. Braden

(57) ABSTRACT

A floating apparatus for supporting fishing accessories includes a base member having a plurality of apertures. The apparatus further has a mechanism for floating the base member and a tether line including a plurality of spring clamps having opposed end portions removably connectable to the base member and a user respectively. The floating mechanism includes a first plurality of floats and a second plurality of floats provided with a conduit formed therein respectively. The second plurality of floats are juxtaposed between the first plurality of floats respectively and spaced radially about the base member. The floating mechanism further includes a resilient cord passing through the first and second plurality of floats via the respective conduits thereof. The floating mechanism further includes a plurality of fastening members having opposed end portions for securing the cord about the perimeter of the base member.

16 Claims, 4 Drawing Sheets

FLOATING APPARATUS FOR SUPPORTING FISHING ACCESSORIES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fishing accessories and, more particularly, to a floating apparatus for supporting fishing accessories and other objects above water level.

2. Prior Art

It is quite common for fishermen to wade in shallow waters while fishing. A typical example is wade fishing in the shallow water areas along the U.S. Gulf Coast. There, the bottom slopes gently from the shoreline to permit a wade fisherman to walk quite a distance out into the water. This is also commonly done in many other areas and regions, limited primarily by water temperature, dangerous currents, and steepness of the bottom extending from the shoreline.

The paraphernalia required for fishing is as simple or as complex as one might wish. Realistically, however, wade fishing practically always requires at least some spare fishing gear such as additional lures, etc. to make a change or to replace those otherwise lost.

Another factor required for practically any fisherman is available bait. While it is possible to fish with artificial lures, it is desirable to fish with live bait and in particular with live minnows, shrimp, etc. It is not otherwise possible to carry bait in the water except in some kind of bait bucket. At this juncture, the bait bucket becomes unwieldy. It must be drug or otherwise rested on the bottom. Ordinarily, it must be submerged to some extent to provide continual water interchange to keep the bait alive. In any event, the equipment essential for operation of a wading fisherman is unwieldy and involves many different things.

Additional fishing tackle is limited to only that which the wading fisherman can put in his pocket or perhaps hang from loops on a belt. Often, a stringer for newly caught fish must also be included. All of these entanglements add to the complexity, and thereby inhibit fishing while wading.

Accordingly, a need remains for a floating apparatus for supporting fishing accessories and the like.

BRIEF SUMMARY OF THE INVENTION

In view of the foregoing background, it is therefore an object of the present invention to provide a floating apparatus for supporting fishing accessories for easy access by a wading or floating fisherman. These and other objects, features, and advantages of the invention are provided by an apparatus including a base member having a substantially annular shape and an adaptable bottom surface for receiving and supporting objects thereon. The base member further has a plurality of apertures radially spaced about a perimeter thereof.

The apparatus further has a mechanism for floating the base member and supporting the objects above a water level. A tether line having opposed end portions is removably connectable to the base member and a user respectively and for maintaining the base member within a select spatial relationship to the user. The tether line preferably includes a plurality of spring clamps for allowing a user to quickly hook and release the base member as desired. The tether line allows a fisherman to wade into shallow water and keep tackle items nearby without disturbing nearby fish.

The base member is formed from resilient mesh material so that the objects can be snuggly held in place during inclement weather conditions. The mesh material allows water to pass upwardly through the bottom surface to thereby maintain the objects at a substantially stable position.

The floating mechanism includes a first plurality of floats having a generally cylindrical shape and provided with a conduit formed substantially medially therein along an arcuate path spaced from the base member. The floating mechanism further includes a second plurality of floats having a generally cylindrical shape and is provided with a conduit formed substantially medially therein and extending along the arcuate path. The second plurality of floats are juxtaposed between the first plurality of floats respectively and are spaced radially about the base member.

The first and second plurality of floats are formed from Styrofoam and the first plurality of floats further have an exterior layer formed from water-proof canvas material for increasing the durability and appearance thereof. The floating mechanism eliminates the need for a fisherman to continually return to shore in order to access tackle item, bait, and other accessories, saving time and effort. It also eliminates the need for fisherman to wear bulky vests that feature tackle storage compartments incorporated into their design. This enhances comfort, particularly in warm climates, and allows a fisherman to cast a line more effectively absent the upper body restrictions of a fishing vest The floating mechanism further includes a resilient cord preferably formed from corrosion resistant material passing through the first and second plurality of floats via the respective conduits thereof for maintaining the plurality of floats at a substantially stable position about the base member. The cord is adaptable between extended and retracted positions for expanding or contracting the floating mechanism as needed. This allows a fisherman to place objects of varying size into the apparatus while maintaining a snug fit.

The floating mechanism further includes a plurality of fastening members having opposed end portions for securing the cord about the perimeter of the base member. The plurality of fastening members include at least one hook selected from the group consisting of S-hooks, spring hooks, and a combination thereof. One end portion is attached to the plurality of apertures and another end portion is removably attachable to the cord so that the user can readily release the base member from the floating mechanism.

In an alternate embodiment, the apparatus includes a bucket having a top opening for receiving objects therein. The bucket is removably positionable medially of the fastening means for being maintained at a substantially stable position.

The apparatus is lightweight, compact and easily transported to and from fishing spots. It is produced from durable materials that resist corrosion in a marine environment and should provide years of effective use.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
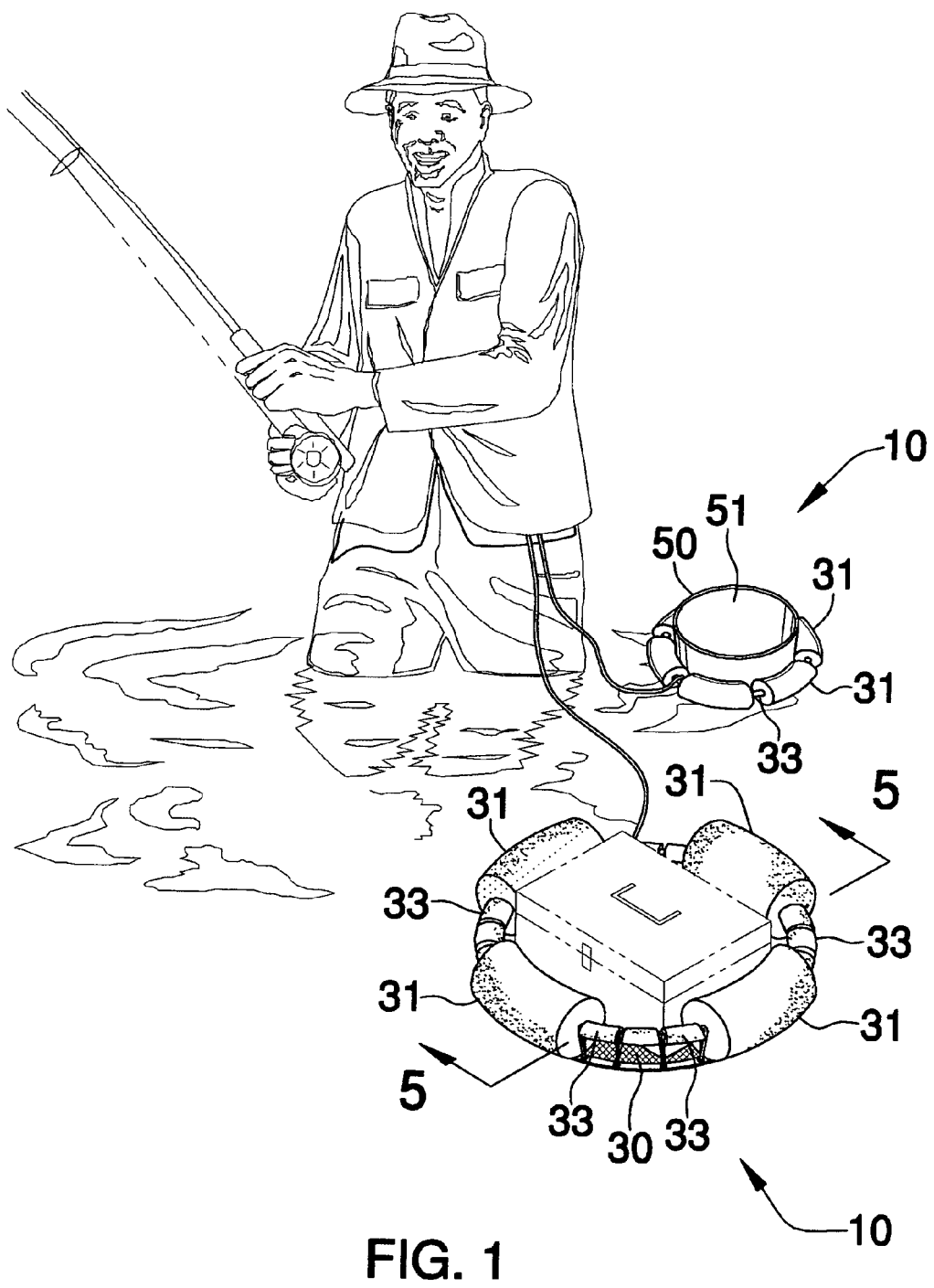
FIG. 1 is a perspective view showing a floating apparatus for supporting fishing accessories, in accordance with the present invention.

The present invention will now be described more fully hereinafter with reference to the accompanying drawings, in which preferred embodiments of the invention are shown. This invention may, however, be embodied in many different forms and should not be construed as limited to the embodiment set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The apparatus of this invention is referred to generally in FIGS. 1-6 by the reference numeral 10 and is intended to provide an apparatus for supporting fishing accessories. It should be understood that the apparatus 10 may be used to support many different types of objects and should not be limited to only fishing accessories.

Figure 2:
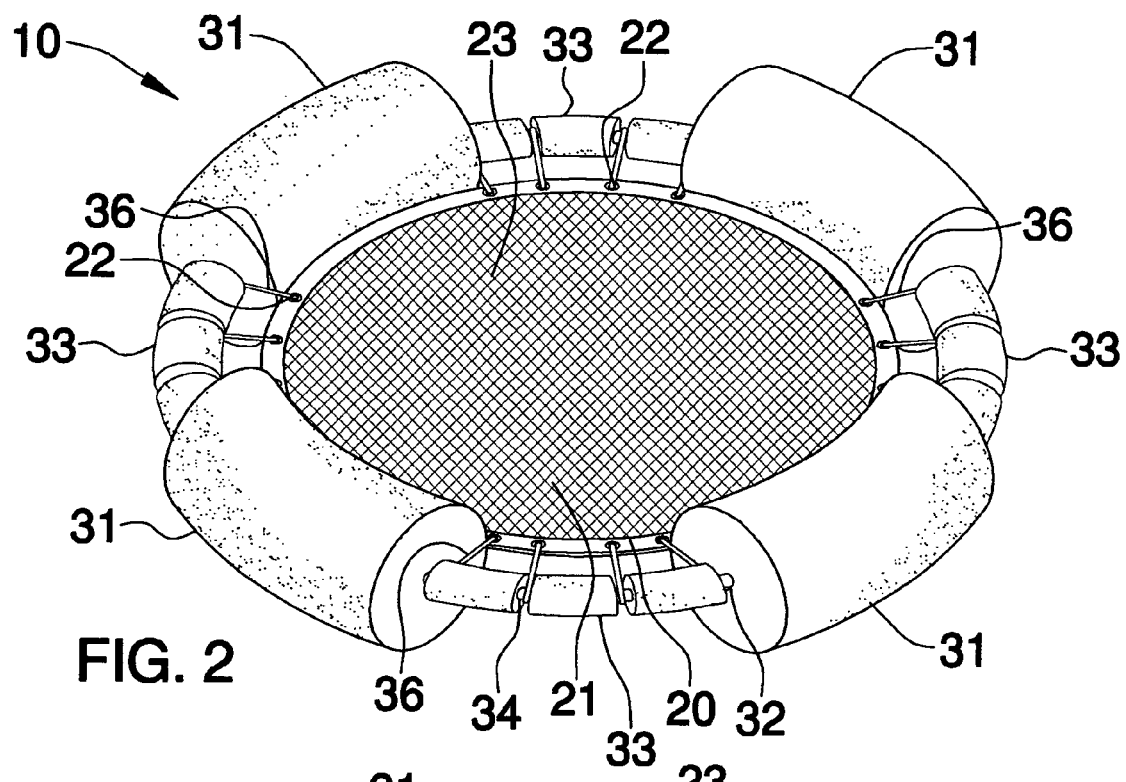
FIG. 2 is a perspective view of the apparatus shown in FIG. 1.
Figure 3:
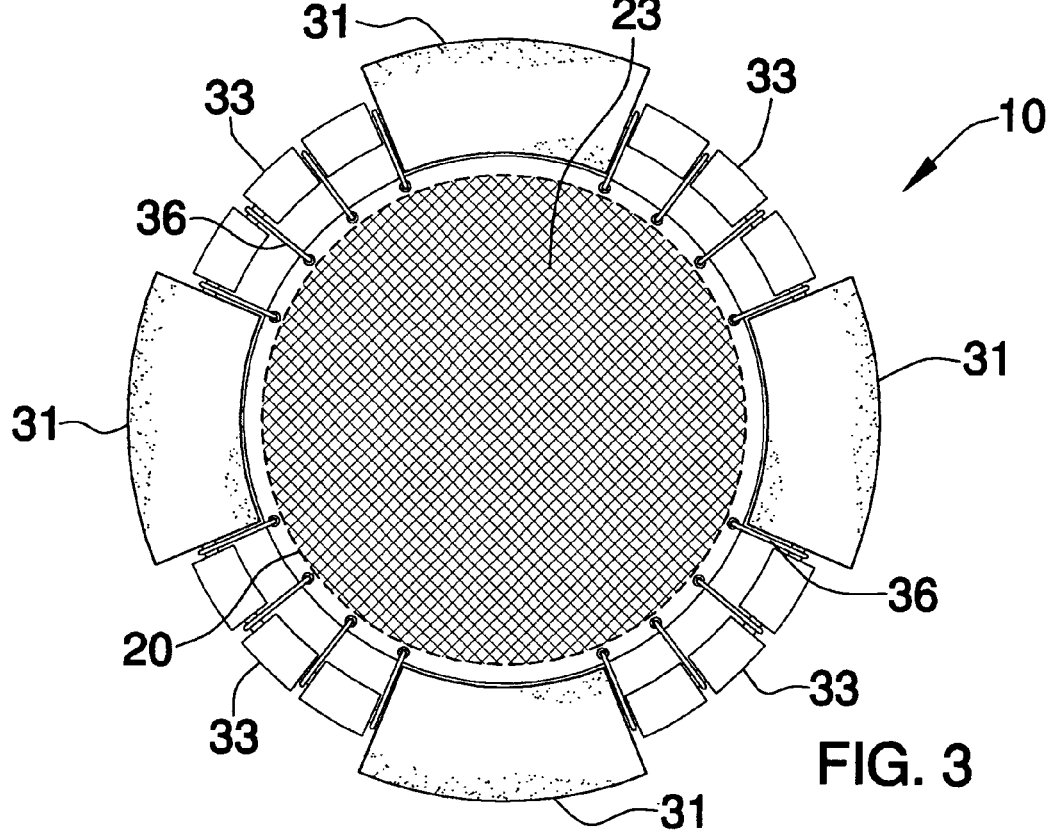
FIG. 3 is a top plan view of the apparatus shown in FIG. 1.

Initially referring to FIGS. 2 and 3, the apparatus 10 includes a base member 20 having a substantially annular shape and an adaptable bottom surface 21 for receiving and supporting objects thereon. The bottom surface 21 is flexible and conforms to the shape of an object placed thereon. For example, bottom surface 21 is capable of stretching along longitudinal and latitudinal planes for securely maintaining a grip about a tackle box. It is noted that the bottom surface 21 is formed from elastic mesh material conforming to various shapes and sizes according to the unique object placed thereon. The base member 20 further has a plurality of apertures 22 radially spaced about a perimeter thereof.

Figure 6:
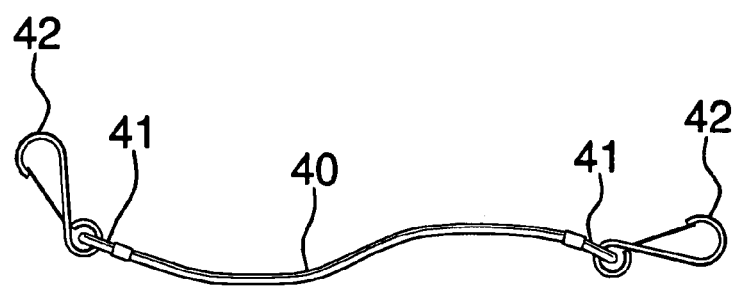
FIG. 6 is a side elevational view of the tether line.

Now referring to FIGS. 1 and 6, the apparatus 10 further has a mechanism 30 for floating the base member 20 and supporting the objects above a water level. A tether line 40 having opposed end portions 41 is removably connectable to the base member 20 and a user, respectively, for maintaining the base member 20 within a select spatial relationship to the user. The tether line 40 includes a plurality of spring clamps 42 for allowing a user to quickly hook and release the base member 20 as desired.

Now referring back to FIGS. 2 and 3, the base member 20 is formed from resilient mesh material 23 so that the objects can be snuggly held in place during inclement weather conditions. The mesh material 23 allows water to pass upwardly through the bottom surface 21 to thereby maintain the objects at a substantially stable position.

Still referring to FIGS. 2 and 3, the floating mechanism 30 includes a first plurality of floats 31 having a generally cylindrical shape and provided with a conduit 32 formed substantially medially therein. The conduit extends along an arcuate path spaced from the base member 20. The floating mechanism 30 further includes a second plurality of floats 33 having a generally cylindrical shape and provided with a conduit 34 formed substantially medially therein.

Such a conduit 34 also extends along the arcuate path so that the second plurality of floats 33 can be juxtaposed between the first plurality of floats 31, respectively, while extending about the radius of the base member 20. The first 31 and second 33 plurality of floats are formed from Styrofoam and the first plurality of floats 31 further have an exterior layer 34 formed from water-proof canvas material for increasing the durability thereof. Of course, the floats may be formed from various buoyant materials, well know to a person of ordinary skill in the art.

Still referring to FIGS. 2 and 3, the floating mechanism 30 further includes a resilient cord 35 formed from corrosion resistant material passing through the first 31 and second 33 plurality of floats via the respective conduits 32, 34 thereof for maintaining the plurality of floats 31,33 at a substantially stable position about the base member 20. The cord 35 is adaptable between extended and retracted positions for expanding or contracting the floating mechanism 30 as needed.

Figure 5:
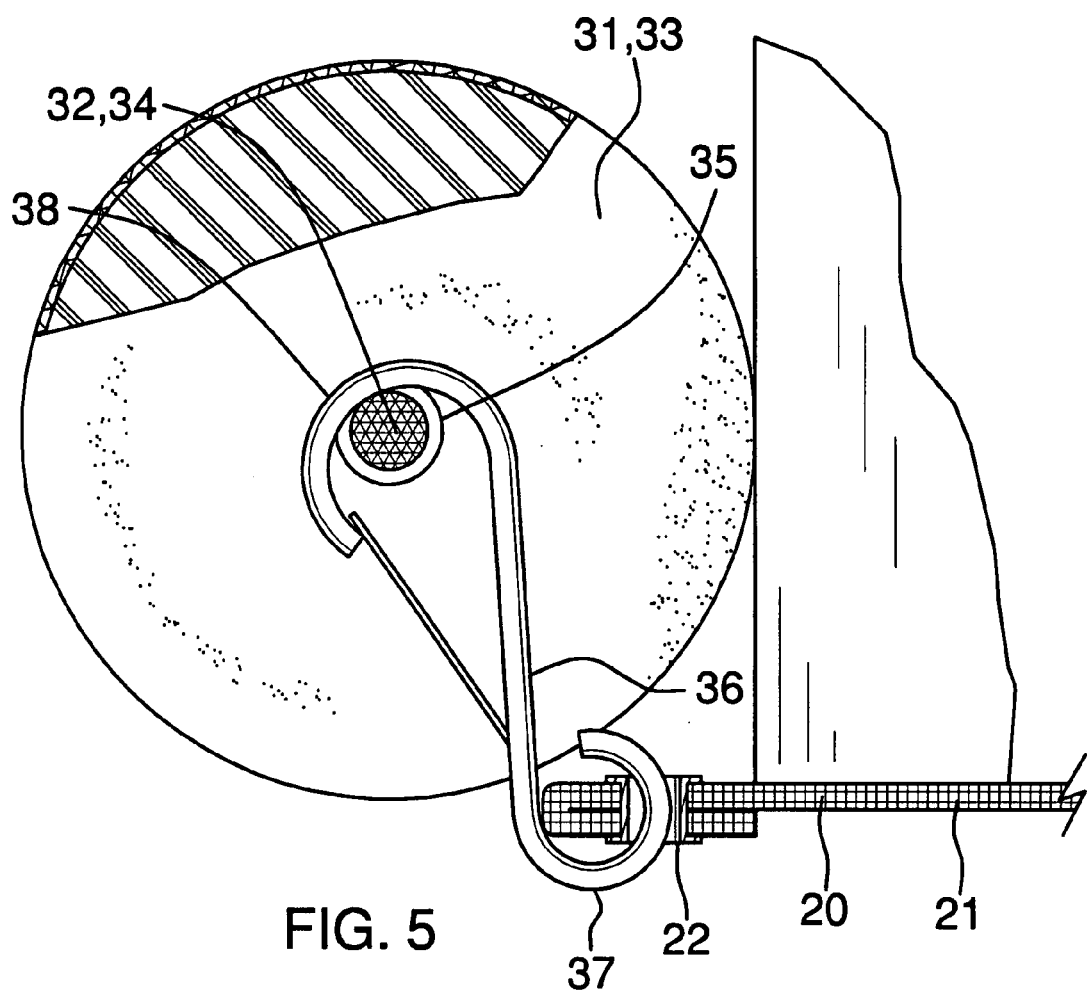
FIG. 5 is a cross-sectional view illustrating the removable S-clamps for securing the cord to the base member, taken along line 5-5.

Still referring to FIGS. 2 and 3, the floating mechanism 30 further includes a plurality of fastening members 36 having opposed end portions 37, 38 for securing the cord about the perimeter of the base member. The plurality of fastening members include at least one hook 39 selected from the group consisting of S-hooks, spring hooks, and a combination thereof. One end portion 37 is attached to the plurality of apertures and another end portion 38 is removably attachable to the cord 35 so that the user can readily release the base member 20 from the floating mechanism 30, as shown in FIG. 5.

Figure 4:
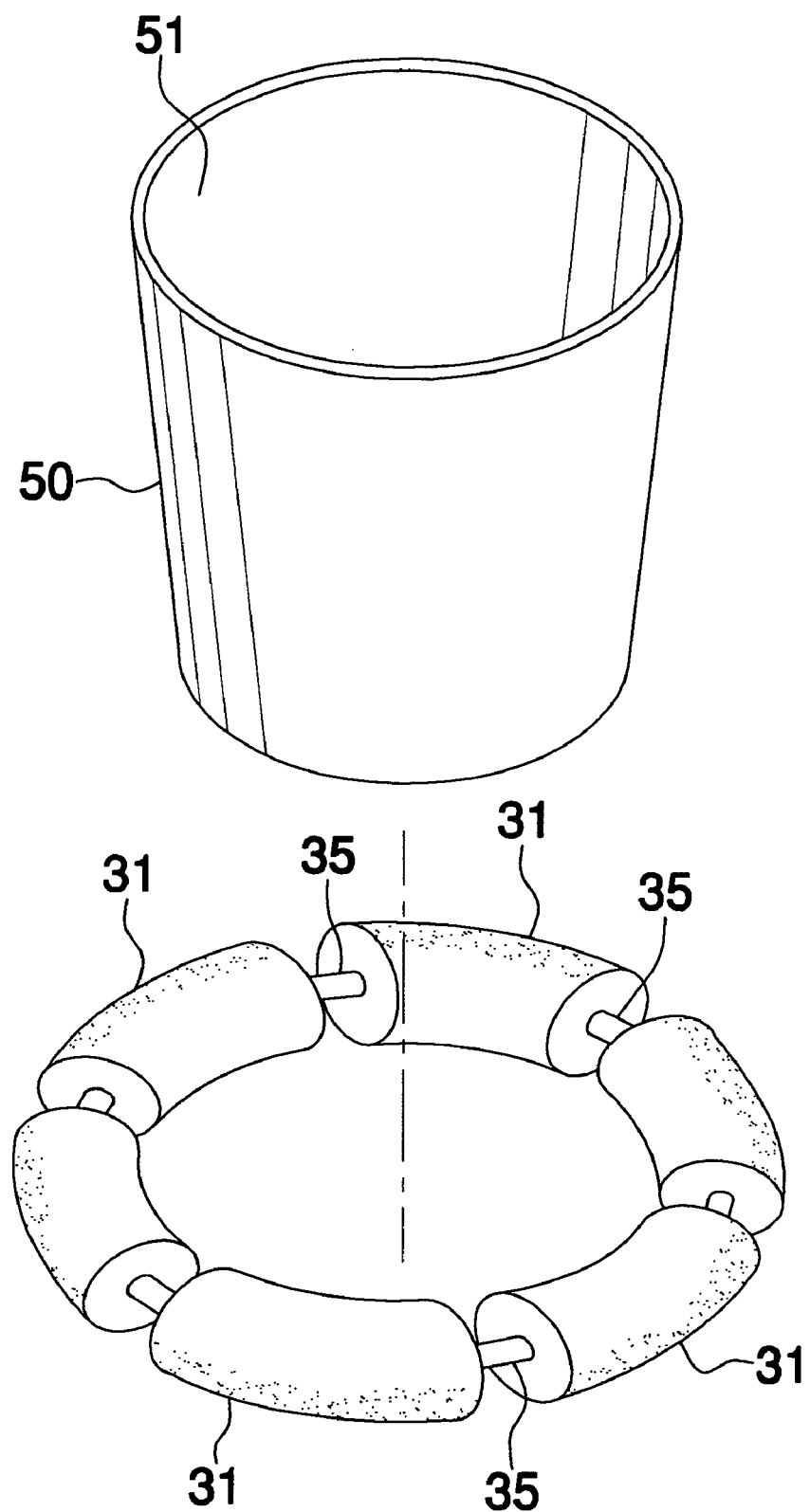
FIG. 4 is a perspective view showing an alternate embodiment of the present invention.

Now referring to FIG. 4, in an alternate embodiment, the apparatus 10' includes a bucket 50 having a top opening 51 for receiving the objects therein. The bucket 50 is removably positionable medially of the floating mechanism 30' for being maintained at a substantially stable position.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A floating apparatus for supporting fishing accessories above water level so that a wading or floating fisherman can readily access the accessories, said apparatus comprising:

a base member having an adaptable bottom surface for receiving and supporting objects thereon, said base member further having a plurality of apertures radially spaced about a perimeter thereof;

means for floating said base member and supporting the objects above a water level; and a tether line having opposed end portions removably connectable to said base member and a user respectively and for maintaining said base member within a select spatial relationship to the user, said tether line comprising a plurality of spring clamps for allowing a user to quickly hook and release said base member as desired;

wherein said floating means comprises a first plurality of floats having a generally cylindrical shape and being provided with a conduit formed substantially medially therein and extending along an arcuate path spaced from said base member;

a second plurality of floats having a generally cylindrical shape and being provided with a conduit formed substantially medially therein and extending along the arcuate path, said second plurality of floats being juxtaposed between said first plurality of floats respectively and being spaced radially about said base member;

a resilient cord passing through said first and said second plurality of floats via the respective conduits thereof for maintaining said plurality of floats at a substantially stable position about said base member, said cord being adaptable between extended and retracted positions; and a plurality of fastening members having opposed end portions for securing said cord about the perimeter of said base member, one said end portion being attached to said plurality of apertures and another said end portion being removably attachable to said cord so that the user can readily release said base member from said floating means.

2. The apparatus of claim 1, wherein said base member is formed from resilient mesh material so that the objects can be snuggly held in place during inclement weather conditions, said mesh material for allowing water to pass upwardly through said bottom surface to thereby maintain the objects at a substantially stable position.

3. The apparatus of claim 1, wherein said first and second plurality of floats are formed from Styrofoam, said first plurality of floats further having an exterior layer formed from water-proof canvas material for increasing the durability thereof.

4. The apparatus of claim 1, wherein said cord is formed from corrosion resistant material.

5. The apparatus of claim 1, wherein said plurality of fastening members comprise: at least one hook selected from the group consisting of S-hooks, spring hooks, and a combination thereof.

6. The apparatus of claim 1, further comprising: a bucket having a top opening for receiving the objects therein, said bucket being removably positionable medially of said floating means for being maintained at a substantially stable position.

7. The apparatus of claim 1, wherein said base member has a substantially annular shape.

8. A floating apparatus for supporting fishing accessories above water level so that a wading or floating fisherman can readily access the accessories, said apparatus comprising:

a base member having an adaptable bottom surface for receiving and supporting objects thereon, said base member further having a plurality of apertures radially spaced about a perimeter thereof, said base member further having a substantially annular shape;

means for floating said base member and supporting the objects above a water level; and a tether line having opposed end portions removably connectable to said base member and a user respectively and for maintaining said base member within a select spatial relationship to the user, said tether line comprising a plurality of spring clamps for allowing a user to quickly hook and release said base member as desired;

wherein said floating means comprises a first plurality of floats having a generally cylindrical shape and being provided with a conduit formed substantially medially therein and extending along an arcuate path spaced from said base member;

a second plurality of floats having a generally cylindrical shape and being provided with a conduit formed substantially medially therein and extending along the arcuate path, said second plurality of floats being juxtaposed between said first plurality of floats respectively and being spaced radially about said base member;

a resilient cord passing through said first and said second plurality of floats via the respective conduits thereof for maintaining said plurality of floats at a substantially stable position about said base member, said cord being adaptable between extended and retracted positions, said cord being formed from corrosion resistant material; and a plurality of fastening members having opposed end portions for securing said cord about the perimeter of said base member, one said end portion being attached to said plurality of apertures and another said end portion being removably attachable to said cord so that the user can readily release said base member from said floating means.

9. The apparatus of claim 8, wherein said base member is formed from resilient mesh material so that the objects can be snuggly held in place during inclement weather conditions, said mesh material for allowing water to pass upwardly through said bottom surface to thereby maintain the objects at a substantially stable position.

10. The apparatus of claim 9, wherein said first and second plurality of floats are formed from Styrofoam, said first plurality of floats further having an exterior layer formed from water-proof canvas material for increasing the durability thereof.

11. The apparatus of claim 9, wherein said plurality of fastening members comprise: at least one hook selected from the group consisting of S-hooks, spring hooks, and a combination thereof.

12. The apparatus of claim 8, further comprising: a bucket having a top opening for receiving the objects therein, said bucket being removably positionable medially of said floating means for being maintained at a substantially stable position.

13. A floating apparatus for supporting fishing accessories above water level so that a wading or floating fisherman can readily access the accessories, said apparatus comprising:

a base member having an adaptable bottom surface for receiving and supporting objects thereon, said base member further having a plurality of apertures radially spaced about a perimeter thereof, said base member further having a substantially annular shape, said base member being formed from resilient mesh material so that the objects can be snuggly held in place during inclement weather conditions, said mesh material for allowing water to pass upwardly through said bottom surface to thereby maintain the objects at a substantially stable position;

means for floating said base member and supporting the objects above a water level; and a tether line having opposed end portions removably connectable to said base member and a user respectively and for maintaining said base member within a select spatial relationship to the user, said tether line comprising a plurality of spring clamps for allowing a user to quickly hook and release said base member as desired;

wherein said floating means comprises a first plurality of floats having a generally cylindrical shape and being provided with a conduit formed substantially medially therein and extending along an arcuate path spaced from said base member;

a second plurality of floats having a generally cylindrical shape and being provided with a conduit formed substantially medially therein and extending along the arcuate path, said second plurality of floats being juxtaposed between said first plurality of floats respectively and being spaced radially about said base member;

a resilient cord passing through said first and said second plurality of floats via the respective conduits thereof for maintaining said plurality of floats at a substantially stable position about said base member, said cord being adaptable between extended and retracted positions, said cord being formed from corrosion resistant material; and a plurality of fastening members having opposed end portions for securing said cord about the perimeter of said base member, one said end portion being attached to said plurality of apertures and another said end portion being removably attachable to said cord so that the user can readily release said base member from said floating means.

14. The apparatus of claim 13, wherein said first and second plurality of floats are formed from Styrofoam, said first plurality of floats further having an exterior layer formed from water-proof canvas material for increasing the durability thereof.

15. The apparatus of claim 13, wherein said plurality of fastening members comprise: at least one hook selected from the group consisting of S-hooks, spring hooks, and a combination thereof.

16. The apparatus of claim 13, further comprising: a bucket having a top opening for receiving the objects therein, said bucket being removably positionable medially of said floating means for being maintained at a substantially stable position.

* * * * *